US007089542B2

(12) United States Patent  
Brand et al.

(10) Patent No.: US 7,089,542 B2  
(45) Date of Patent: Aug. 8, 2006

(54) METHOD AND APPARATUS FOR FINDING ERRORS IN SOFTWARE PROGRAMS USING SATISFIABILITY OF CONSTRAINTS

(75) Inventors: Daniel Brand, Millwood, NY (US); John A. Darringer, Mahopac, NY (US); Florian Krohm, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 10/318,823

(22) Filed: Dec. 13, 2002

(65) Prior Publication Data

US 2004/0117772 A1 Jun. 17, 2004

(51) Int. Cl.
*G06F 9/45* (2006.01)
*G06F 9/44* (2006.01)

(52) U.S. Cl. .................. 717/143; 717/155; 717/156
(58) Field of Classification Search ........ 717/141–145, 717/154–157; 706/45–46
See application file for complete search history.

(56) References Cited

U.S. PATENT DOCUMENTS

| | | | | |
|---|---|---|---|---|
| 5,920,716 | A | * | 7/1999 | Johnson et al. .............. 717/141 |
| 5,978,588 | A | * | 11/1999 | Wallace ....................... 717/159 |
| 6,014,518 | A | * | 1/2000 | Steensgaard ................. 717/154 |
| 6,035,107 | A | * | 3/2000 | Kuehlmann et al. ........... 716/1 |
| 6,070,009 | A | * | 5/2000 | Dean et al. .................. 717/130 |
| 6,175,948 | B1 | * | 1/2001 | Miller et al. ................... 716/7 |
| 6,230,312 | B1 | * | 5/2001 | Hunt ........................... 717/108 |
| 6,263,491 | B1 | * | 7/2001 | Hunt ........................... 717/130 |
| 6,321,379 | B1 | * | 11/2001 | Callahan, II ................. 717/141 |
| 6,473,884 | B1 | * | 10/2002 | Ganai et al. .................... 716/3 |
| 6,499,137 | B1 | * | 12/2002 | Hunt ........................... 717/164 |
| 6,643,630 | B1 | * | 11/2003 | Pegatoquet et al. ........... 706/45 |
| 6,675,379 | B1 | * | 1/2004 | Kolodner et al. ........... 717/155 |
| 6,925,638 | B1 | * | 8/2005 | Koved et al. ................ 717/155 |
| 6,957,422 | B1 | * | 10/2005 | Hunt ........................... 717/130 |

OTHER PUBLICATIONS

Wismuller, "Debugging of globally optimized program using data flow analysis", ACM SIGPLAN, pp. 278-289, 1994.*

Peymandoust et al, "Symbolic alegebra and timing driven data flow synthesis", IEEE, pp. 300-305, 2001.*

Mock et al, "Improving program slicing with dnamic points to data", ACM SIGSOFT, pp. 71-80, 2002.*

Gupta et al,"Hybrid slicing integrating dynamic information with static analysis", ACM Tran. on software eng. & methodology, vol. 6, No. 4, pp. 370-397, 1997.*

* cited by examiner

*Primary Examiner*—Anil Khatri
(74) *Attorney, Agent, or Firm*—Ryan, Mason & Lewis, LLP

(57) ABSTRACT

A method and apparatus are provided for analyzing software programs. The invention combines data flow analysis and symbolic execution with a new constraint solver to create a more efficient and accurate static software analysis tool. The disclosed constraint solver combines rewrite rules with arithmetic constraint solving to provide a constraint solver that is efficient, flexible and capable of satisfactorily expressing semantics and handling arithmetic constraints. The disclosed constraint solver comprises a number of data structures to remember existing range, equivalence and inequality constraints and incrementally add new constraints. The constraint solver returns an inconsistent indication only if the range constraints, equivalence constraints, and inequality constraints are mutually inconsistent.

21 Claims, 11 Drawing Sheets

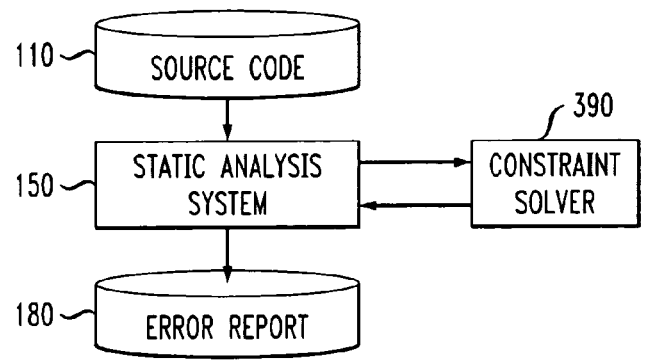

FIG. 5

| NODE IDENTIFIER | RANGE |
|---|---|
| NODE | [A,B] [C,D] |
| NODE | [P,Q] [R,S] [T,U] |
| NODE | [V,W] |

FIG. 6

| REPRESENTATIVE NODE | REST OF NODE CLASS |
|---|---|
| NODE | NODE, NODE, NODE |
| NODE | NODE |
| NODE | NODE |

FIG. 7

| COEFFICIENT | NODE | COEFFICIENT | NODE | RANGE |
|---|---|---|---|---|
| $a_1$ | $A_1$ | $b_1$ | $B_1$ | $R_1$ |
| $a_2$ | $A_2$ | $b_2$ | $B_2$ | $R_2$ |

FIG. 10
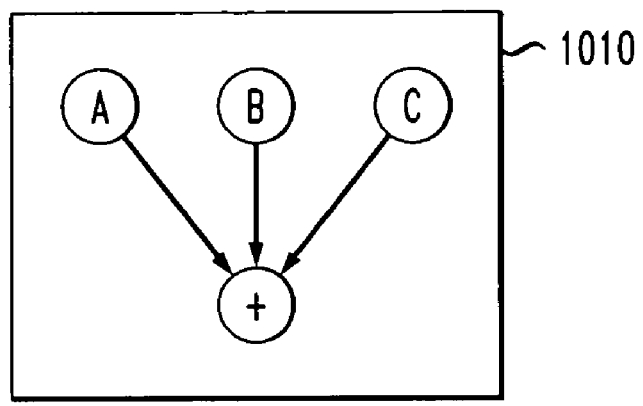
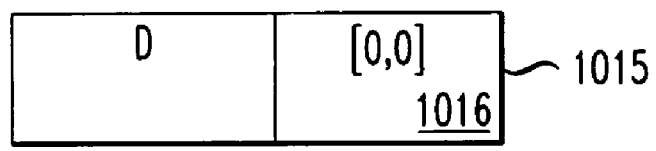
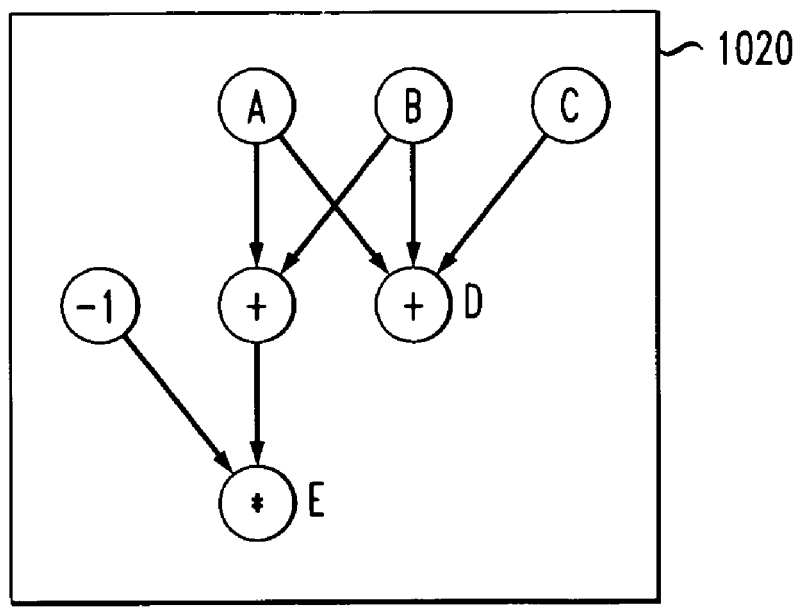
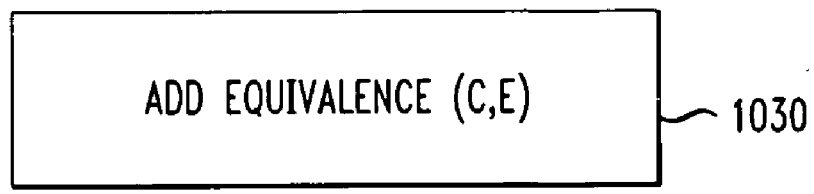

FIG. 15

```
-- ERROR1   /*UNINITIALIZED*/   >>>ERROR1_fbi_get_node_num_fc5bc4ac9aca09 —— 1581
"fbi_print.c", line 427:   uninitialized 'p->ix'
ONE POSSIBLE PATH LEADING TO THE ERROR:
"fbi_print.c", line 411: entering the loop for the first time
"fbi_print.c", line 411: executing the loop exactly once
"fbi_print.c", line 411: entering the loop for the last time
"fbi_print.c", line 416: allocating using malloc
"fbi_print.c", line 422: does not select any case
"fbi_print.c", line 427: getting the value of 'p->ix'
```

(180)

METHOD AND APPARATUS FOR FINDING ERRORS IN SOFTWARE PROGRAMS USING SATISFIABILITY OF CONSTRAINTS

FIELD OF THE INVENTION

The present invention relates generally to writing, debugging, or maintaining software programs, and more specifically, the invention relates to the use of static analysis techniques to write, debug, or maintain software programs (or a combination of the foregoing).

BACKGROUND OF THE INVENTION

There are two general techniques for debugging software programs. Dynamic debugging methods form a set of test-cases and the expected result(s) for each test-case. The program is then executed on the set of test cases and the result(s) of the execution are compared with the expected result(s). A mismatch is a symptom of an error in the program. Static debugging methods, on the other hand, form a set of properties that the program should satisfy. For example, a static debugging technique may require that a program should not crash; should satisfy given rules of accessing data; and should have outputs with a given relation to its inputs.

Static methods analyze the input source code without executing it. They search for a path violating one of the properties that is to be reported as an error. In this search, static methods tradeoff efficiency for accuracy. A key issue is the determination of whether the path is feasible, i.e., are there input values that would cause the path to be executed. In general, static debugging techniques excel at discovering rare bugs whereas dynamic debugging techniques excel at finding common bugs and testing multiple modules. Thus, the two test methods are complementary.

"Lint" software testing and debugging tools place a high degree of importance on efficiency and do not determine the feasibility of paths. Commercial implementations of Lint tools include Parasoft, Flexlint and Reasoning. Lint tools do not try to avoid "false errors." "Formal verifiers," on the other hand, are software debugging tools that determine feasibility. For that purpose, formal verifiers collect the constraints for a path to be feasible, and pass those constraints to a constraint solver. If the constraint solver determines the constraints to be consistent, then an error can be reported.

Static analysis tools parse the source programs to produce a parse tree. A parse tree is a representation of the structure of the given input source programs. Parsing is performed using standard compiler techniques. In addition, static analysis tools perform semantic analysis to produce a flow graph from the given parse tree, using standard compiler techniques (where in place of emitting code, flow-graph nodes are generated). The nodes represent data flow operations, such as "+," as well as control flow operations, such as variable assignments. There are also nodes representing conditional branching that record the condition(s) of the test. Thereafter, an analysis of the flow graph is performed. The actual form of flow graph analysis differs for different tools, but in general involves traversing the flow graph and doing some operations for each node traversed. Tools that determine feasibility of paths have to take into account the nodes representing conditional branches. From these conditional branch nodes, the tools collect the constraints for following each path. These constraints involve operations and predicates from various domains: arithmetic, pointers, arrays, and other data structures.

The constraint solvers need to understand these domains, and they use several approaches for that purpose. For example, arithmetic is in general undecidable, but there is a decidable subset, referred to as Presburger arithmetic, that is adequate for the purposes of software analysis. For a detailed discussion of Presburger arithmetic, see, for example, Presburger, On the Completeness of a Certain System of Arithmetic of Whole Numbers in Which Addition Occurs as the only Operation, Hist. Philos. Logic, 12(2): 225–233, 1991, Translated from German and with commentaries by Dale Jacquette, incorporated by reference herein. However, as the decision procedure for Presburger arithmetic has a super exponential lower bound, Presburger arithmetic is too expensive for the purposes of software analysis. Therefore, only subsets of Presburger arithmetic are being used.

Solvers employing Presburger arithmetic, or derivatives thereof, such as linear integer programing, however, are inefficient. Such solvers are complete even for types of constraints unnecessary in software analysis, making them less efficient. At the same time, such solvers are inflexible, i.e., it is not possible to add operators outside of their theory. Another general approach to constraint solving relies on rewrite rules. For a detailed discussion of rewrite rules, see, for example, N. Dershowitz & J. P. Jouannaud, Rewrite Systems, Handbook of Theoretical Computer Science, Volume B, Chapter 15, North-Holland, 1989, incorporated by reference herein. Generally, rewrite rules modify the constraints (or the flow graph) in order to arrive at an answer. While solvers employing rewrite rules express the semantics well, they are inefficient with arithmetic constraints.

The static techniques (referred to as lint above) that do not evaluate the feasibility of paths tend to issue too many complaints that, in fact, do not represent any error in the program. As a result, programmers tend to ignore all complaints issued by such tools. Formal verifiers check a given implementation against a user-supplied specification. Verifiers spend more time than other source code analysis tools, achieving the highest degree of accuracy. However, there is still uncertainty. First, the verification tool may not know which input combinations are considered legal and, secondly, the problem may be too large for the verifier to handle. Both of these kinds of uncertainties are resolved by placing the burden of proof on the user. Specifically, an error is reported if the user-provided information does not allow the verifier to prove the absence of error.

Static techniques that evaluate the feasibility of paths rely on a constraint solver. A constraint solver should be efficient; sound (i.e., what percentage of constraints declared inconsistent are indeed inconsistent); complete (i.e., what percentage of constraints declared consistent are indeed consistent); and flexible (i.e., how easy is it to extend the solver). As it is impossible to satisfy all four properties perfectly, traded-offs must be made. The main tradeoff is between efficiency and completeness. Ideally, a solver should be only as complete as required by the application of software analysis; being less complete would result in incorrect error reports, being more complete would result in reduced efficiency (although more program errors would be discovered).

A constraint solver is needed that remembers former constraints and adds new constraints incrementally. The solver should be efficient, flexible and capable of satisfactorily expressing semantics and handling arithmetic constraints.

SUMMARY OF THE INVENTION

Generally, a method and apparatus are provided for analyzing software programs. The invention combines data flow analysis and symbolic execution with a new constraint solver to create a more efficient and accurate static software analysis tool. The disclosed constraint solver combines rewrite rules with arithmetic constraint solving to provide a constraint solver that is efficient, flexible and capable of satisfactorily expressing semantics and handling arithmetic constraints.

From the process point of view, the disclosed constraint solver analyzes a path in a software program. Initially, input constraints are received for a path in the software program to be feasible. Thereafter, one or more rewrite rules are applied to a flow graph of the software program, where the one or more rewrite rules define how the flow graph can change. At least one new node or new edge is added to the flow graph based on the rewrite rules. Finally, new constraints are derived by arithmetic constraint solving from the input constraints, flow graph and one or more existing constraints and added to the existing constraints.

The disclosed constraint solver comprises a number of data structures to remember existing constraints and incrementally add new constraints. In particular, the constraint solver includes a range-constraint data structure having at least one node record corresponding to a range constraint, each node record having a node identifier identifying a node that is an operation in a flow graph of the software program and zero or more intervals associated with the respective node, the intervals including all of the possible values that the node can have during the execution of the software program; an equivalence data structure having at least one record that identifies zero or more sets of equivalent nodes that have an equivalence constraint, the equivalence constraint indicating that each of the nodes in one of the sets of equivalent nodes have the same value during a time in an execution of the software program; an inequality data structure having at least one inequality record, each defining an inequality constraint, the inequality constraint being that the product of a first value and a first node added to the product of a second value and a second node is within an inequality range; and a processor that returns an inconsistent indication only if the three data structures are mutually inconsistent.

A more complete understanding of the present invention, as well as further features and advantages of the present invention, will be obtained by reference to the following detailed description and drawings.

BRIEF DESCRIPTION OF THE DRAWINGS

FIG. 1 is a block diagram of one embodiment of the present invention;

FIGS. 2*a* and 2*b* are examples of software programs processed by the present invention;

FIG. 5 is a sample table from an exemplary range-constraint data structure;

FIG. 6 is a sample table from an exemplary equivalence class data structure;

FIG. 7 is a sample table from an exemplary inequality data structure;

FIG. 10 is an example of a rewrite rule;

FIG. 15 is a block diagram of an example error report produced by the present invention.

DETAILED DESCRIPTION OF PREFERRED EMBODIMENTS

Figure 3:
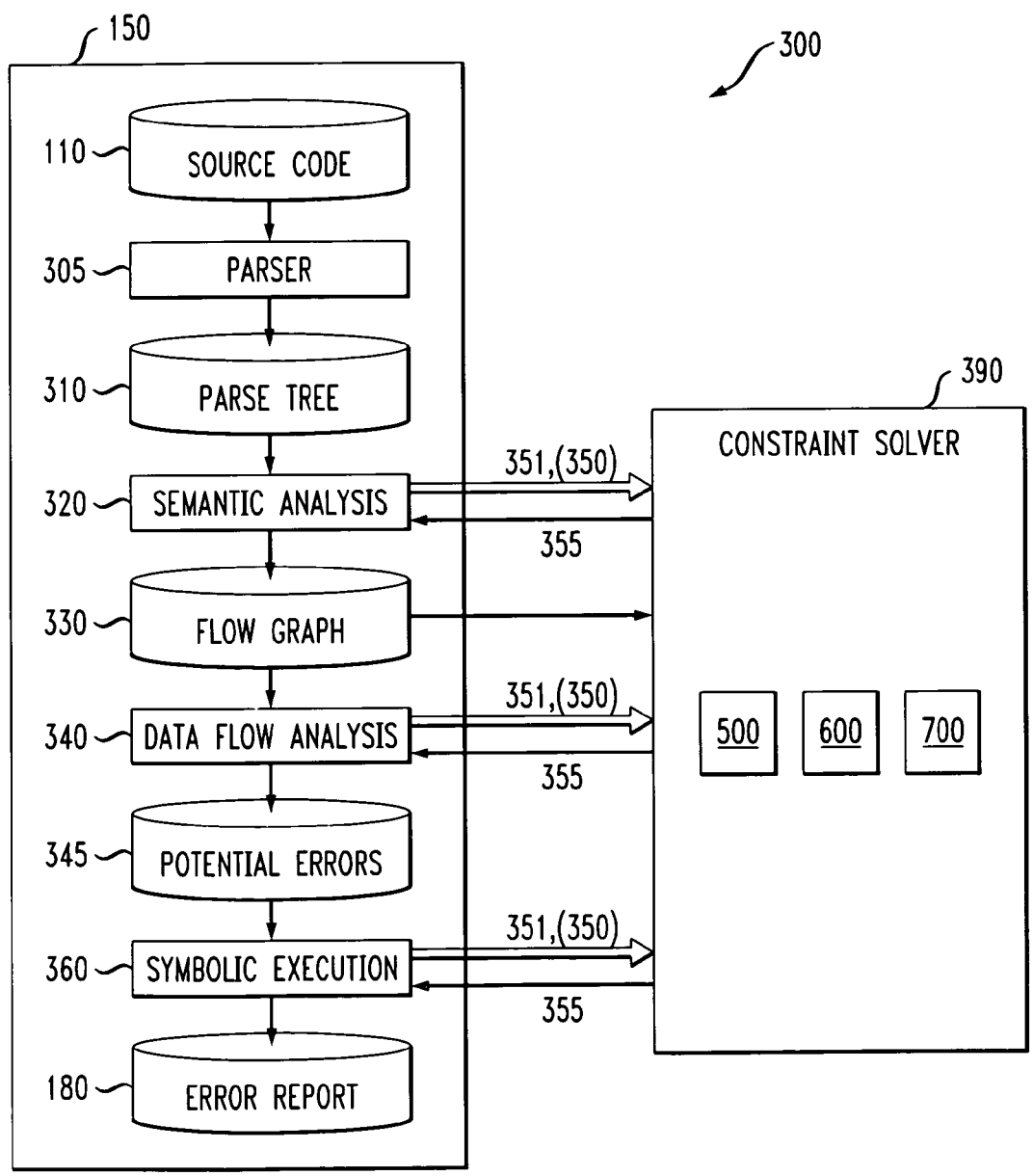
FIG. 3 is a flow chart describing an exemplary software analysis system using the constraint solver of the present invention.

The present invention combines data flow analysis and symbolic execution with a new constraint solver to create a more efficient and accurate static software analysis tool. The tool overcomes the main weakness of symbolic execution, namely, path explosion, by using data-flow analysis to find potential faults. The goal is to discover the faults while requiring minimal effort from the programmer. The tool reports a fault symptom only if it is associated with a feasible path, i.e., a path that can possibly execute. The constraint solver of the present invention combines rewrite rules with arithmetic constraint solving. As previously indicated, conventional rewrite rule solvers express the semantics well, but are very inefficient with arithmetic constraints. Thus, integrating the two methods results in an efficient and accurate constraint solver.

FIG. 1 is a block diagram of one preferred embodiment of the present invention. As shown in FIG. 1, a static analysis is performed by a static analysis system 150 on source code 110 to generate an error report 180. The source code 110 is a set of one or more input files (programs), as input into a standard compiler. The error report 180 is a list of error symptoms in the source code 110, as will be described in more detail below in conjunction with FIG. 15. The static analysis system 150 interacts with the constraint solver 390 to perform the static analysis of the source code 110. In one exemplary embodiment, the static analysis system 150 offers a list of symptoms that can be detected and a user selects (from this list) the symptoms to be reported. The selection is based on the fact that none of the selected symptoms should occur in the intended program.

FIGS. 2*a* and 2*b* show an example of programs 210, 220 that may be processed by the present invention. The program 210 in FIG. 2*a* contains an error in statement 215 {if(!I)}. A corrected version of the program is shown in FIG. 2*b*, where the statement 225 is corrected {if(I)}. As a result, the function in statement 215 may return an uninitialized value of X, which is a symptom that can be detected.

The symptoms or errors detected by the static analysis system 150 can generally be divided into three levels of difficulty. For a more detailed discussion of an exemplary set of difficulty levels, see D. Brand, A Software Falsifier, Int'l Symposium on Software Reliability Engineering, IEEE Computer Society Press, 174–85 (October, 2000), incorporated by reference herein. These symptoms are both generic (i.e., violations of the programming language semantics), as well as project specific (mainly violations of constraints on data base accesses). Symptoms of difficulty 0 are not associated with a path. They are typically associated with just one statement, and they could cause a failure no matter which path is followed in reaching that statement. These kinds of symptoms are not the focus of the present invention, because many of them are covered by existing commercial tools. Only those difficulty 0 symptoms that have been explicitly requested by a user are detected.

Difficulty 1 symptoms are violations of a finite state property along some execution path. Difficulty 2 symptoms include "index out of array range," "dereferencing a null pointer," or "failed assertion." In general, all symptoms of difficulty 2 are expressible as assertions, which is what the static analysis system 150 relies on for project specific symptoms of difficulty 2. Such assertions are inserted automatically into the code 110 during parsing, and therefore do not require special consideration. Both types of symptom share the problem of identifying a feasible path whose execution will cause the symptom.

In contrast to a verifier or lint, the goal of the static analysis system 150 is to ensure that any reported error can actually cause a failure during execution. In this sense, the static analysis system 150 is related to a compiler with the exception that the static analysis system 150 is allowed more time so as to detect more difficult errors. For example, the static analysis system 150 can run overnight to check code 110 written during the day.

FIG. 3 is a schematic block diagram of an exemplary static analysis system 150 in accordance with the present invention. As shown in FIG. 3, the exemplary static analysis system 150 interacts with a constraint solver 390 incorporating features of the present invention. For a detailed discussion of a suitable static analysis system 150, see, for example, D. Brand, Error Detection by Data Flow Analysis Restricted to Executable Paths, RC 21484, IBM T. J. Watson Research Center, (May, 1999), incorporated by reference herein. While the static analysis system 150 is not within the scope of the present invention, those portions of the static analysis system 150 that interact with the constraint solver 390 of the present invention are briefly discussed hereinafter.

Figure 4:
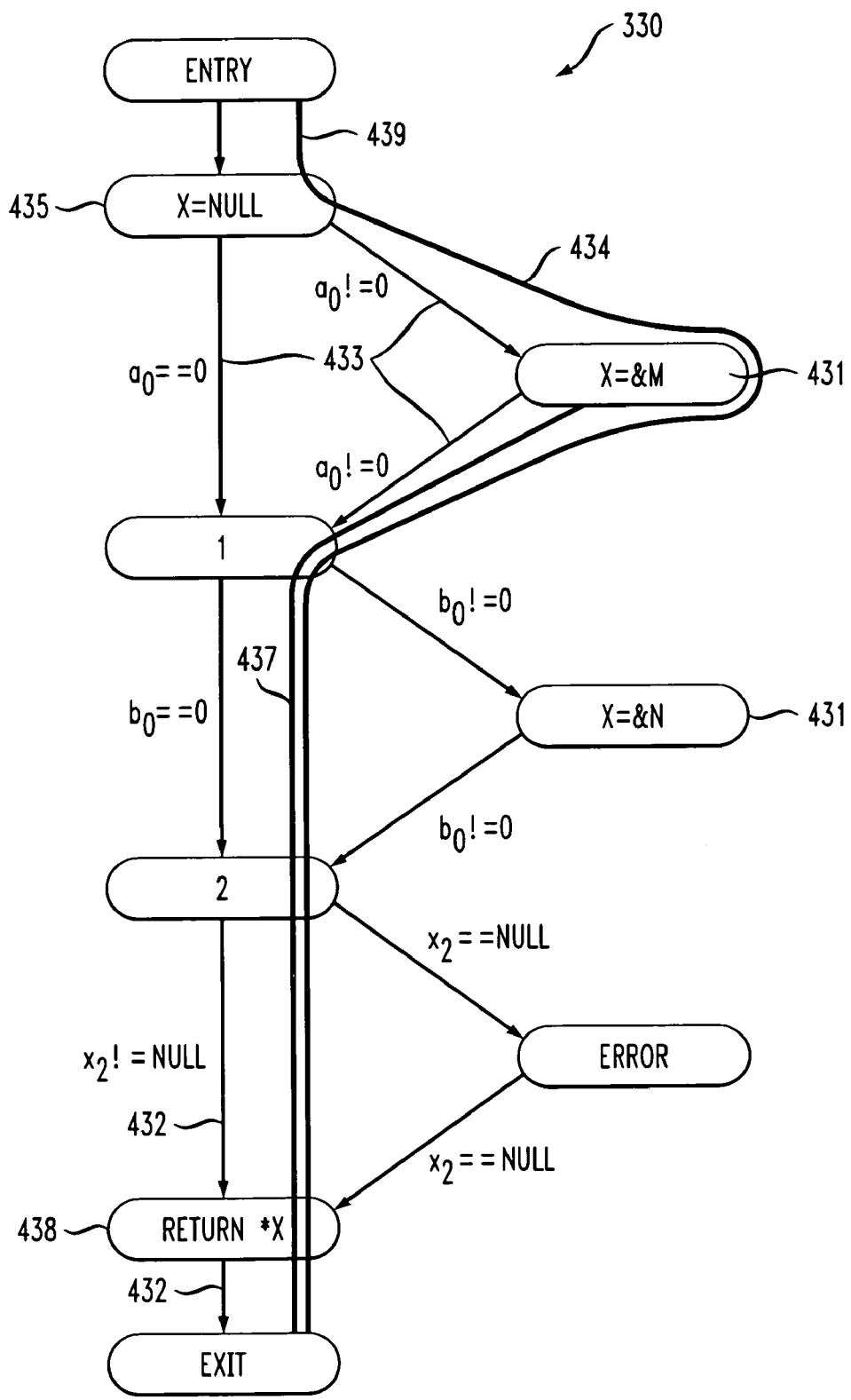
FIG. 4 is an example of a flow graph of FIG. 3.

As shown in FIG. 3, the static analysis system 150 includes a parser 305 that analyzes the syntactic structure of the source code 110 (as is done in standard compilers) and produces a parse tree 310, a representation of that syntactic structure. Thereafter, a semantic analyzer 320 extracts the semantic meaning of the parse tree 310 to produce a flow graph 330. An exemplary flow graph 330 is shown in FIG. 4. The flow graph 330 is a graphical representation of the semantics of the source code 110 and consists of nodes, such as nodes 431, and edges, such as edges 432. The nodes 431 represent executable statements and are connected by edges 432 if control can flow from one node 431 to another node 431. If the flow is only conditional, then the condition 434 is attached to the arc (edge) 433 connecting the two nodes 431.

The semantic analyzer 320 may optionally utilize the constraint solver 390 to eliminate paths 439 through the source code 110 that will not be traversed during execution of the program 110. Thus, the overall software analysis is more efficient, since the semantic analyzer 320 will not have to be performed on the entire source code 110. When the semantic analyzer 320 encounters a conditional node 435 in the parse tree 310, the semantic analyzer 320 will form a constraint 350 for following one of the branches 433 emanating from the conditional node 435 and pass the constraint 350 to the constraint solver 390.

As shown in FIG. 3 and discussed further below in conjunction with FIGS. 5 through 7, respectively, the constraint solver 390 includes one or more range constraint data structures 500, equivalence class data structures 600 and inequality data structures 700. Generally, the constraint solver 390 determines whether a particular set of conditions is consistent. The data structures 500, 600, 700 record the constraints, equivalences and inequivalences, respectively, embodied in a given program 110. The data structures 500, 600, 700 are generated and maintained by the constraint solver 390 in accordance with the present invention.

The constraint solver 390 will process a new constraint 350 received from the semantic analyzer 320 to determine if the new constraint is inconsistent with the existing constraints 500, 600, 700. Thereafter, the constraint solver 390 will inform the semantic analyzer 320 of the result 355. If the new constraint is inconsistent, the semantic analyzer 320 can skip over the corresponding portion 437 of the parse tree 310.

The static analysis system 150 simplifies the graph representation 330. The simplification has two goals: reducing the graph 330 in size for efficiency and, more importantly, making the graph 330 canonical, where possible. To reduce the size of the graph 330, some standard compiler optimizations are performed, as described in A. V. Aho & J. D. Ullman, Compilers: Principles, Techniques and Tools, Addison-Wesley (1989), such as constant propagation or value numbering. Code motion is generally not performed because that would make it harder to report a fault symptom to the user in terms of his program 110.

For ease of deduction, it is important to make the graph 330 as canonical as possible. In other words, expressions need to be rewritten to allow maximum sharing of subexpressions. For example, suppose that the two expressions $2*A-2*B<12$ and $B-A+6<1$ appear in the program. They will be brought into the formats $A-B<6$ and $A-B>5$, sharing the common subexpression $A-B$ so that, if their consistency ever needs to be established, the result will be immediate.

Once the flow graph 330 has been simplified, the static analysis system 150 performs a data flow analysis 340, in a known manner. For a detailed discussion of a suitable data flow analysis 340 technique, see, for example, D. Brand, Error Detection by Data Flow Analysis Restricted to Executable Paths, RC 21484, IBM T. J. Watson Research Center, (May, 1999), incorporated by reference herein. Generally, the data flow analyzer 340 traverses paths 439 in the flow graph 330 and produces a list of potential errors 345. A potential error in the list 345 is a set of paths 439 through the flow graph 330. If any of the paths 439 could be executed, then the software 110 would fail at the last node 438 in the path 439. The potential errors 345 identified by the data flow analyzer 340 are then processed by a symbolic execution stage 360, in a known manner, to generate the final error report 180. For a detailed discussion of a suitable symbolic execution stage 360, see, for example, D. Brand, Error Detection by Data Flow Analysis Restricted to Executable Paths, RC 21484, IBM T. J. Watson Research Center, § 5.3, at 17 (May, 1999).

General symbolic execution 360 considers all feasible paths 439, the number of which could grow exponentially with the size of a program 110. (In the presence of loops, the number of paths 439 would be infinite, but loops are replaced by recursive procedures.) In contrast, dataflow analysis 340 combines information calculated for two reconverging paths 439, resulting in behavior that is linear with the size of the program 110. Dataflow analysis 340 has the advantage of efficiency, but its results cannot generally be used to report a fault symptom. Any time information is merged, some details are lost, and it is uncertain whether there is actually a feasible path 439 to the symptom. The results of symbolic execution 360 can be used to report a fault symptom, but symbolic execution 360 suffers from an exponential explosion of paths 439.

Therefore, the static analysis system 150 combines the advantages of the two types of analyses. Dataflow analysis 340 is used as a filter to screen out areas definitely containing no fault symptom. If dataflow analysis 340 finds the possibility of a fault, a "bundle" of paths is calculated that can lead to the symptom of the fault. Symbolic execution 360 is then restricted to this bundle of paths 439, which is normally small enough to be efficient. Symbolic execution 360 selects one path 439 from the bundle to be reported to the user; however, the bundle information is also given to the user because knowing which other paths 439 lead to the symptoms helps to determine what is relevant to the fault.

In addition, the data flow analyzer 340 may optionally use the constraint solver 390 to eliminate paths in the flow graph 330 that will not be traversed during execution of the program 110. When the data flow analyzer 340 encounters a conditional node 435 in the flow graph 330, the data flow analyzer 340 will form a constraint 350 for following one of the branches 433 emanating from the conditional node 435 and pass the constraint 350 to the constraint solver 390. The constraint solver 390 will process the new constraint 350 to determine if the new constraint is inconsistent with the existing constraints 500, 600, 700 and will inform the data flow analyzer 340 of the result 355. If the new constraint is inconsistent, the data flow analyzer 340 can skip over the corresponding portion 437 of the flow graph 330.

The symbolic executor 360 traverses paths 439 in the flow graph 430 that are identified by the potential errors 345. When the symbolic executor 360 encounters a conditional node 435 in the flow graph 330, the symbolic executor 360 will form a constraint 350 for following one of the branches emanating from the conditional node 435 and pass the constraint 350 to the constraint solver 390. The constraint solver 390 will process the new constraint 350 to determine if it is inconsistent with the existing constraints 500, 600, 700 and will inform the symbolic executor 360 of the result 355. If the new constraint is inconsistent, the symbolic executor 360 can skip over the corresponding portion 437 of the flow graph 330. If the symbolic executor 360 reaches the end of the path 438 before the constraint solver 390 reports an inconsistency 355, then there is an error in the source code 110. For a description of the preferred embodiment of the symbolic executor 260, see D. Brand, Error Detection by Data Flow Analysis Restricted to Executable Paths, RC 21484, IBM T. J. Watson Research Center, (May, 1999).

Constraint Solver

As previously indicated, the constraint solver 390 determines whether a particular set of conditions is consistent. In a falsifier, such as the static analysis system 150, the static analysis system 150 must show that a path 439 containing a fault is feasible. Therefore, if a particular path 439 is too difficult to decide, it is acceptable to give up and report nothing. In a verifier, however, the user must show the absence of error. If the verifier is unable to prove that the evidence provided by the user is sufficient, the user must be able to provide some additional information or evidence. The evidence tends to be in the form of assertions describing the state of the program 110, or in the form of properties of some procedures, on which the program 110 relies. Such assertions need to describe the results of iteration; to describe the results of iteration requires quantifiers or some other forms of iteration. Therefore, the constraint solver 390 of a verifier must deal with quantifiers or some form of induction. But for a falsifier, no quantifiers are needed, or more exactly, all variables have an implicit existential quantifier.

In general, the constraint solver 390 contains data structures 500, 600, 700 which at any time contain a set of predicates and has the following operations:
1) a solver 390 can be initialized to any set of predicates;
2) a solver 390 can be queried as to whether its set of predicates is satisfiable (consistent);
3) a solver 390 implies a predicate p if any parameter values satisfying the predicates of the solver 390 also satisfy p;
4) the solver 390 in union with p is a new solver 390 obtained from the original solver 390 by adding the predicate p;
5) the intersection of a first constraint solver 390 and a second constraint solver 390 is a new solver 390 containing those predicates implied by both the first constraint solver 390 and the second constraint solver 390, and
6) the "simplification" of a predicate p under the conditions of a constraint solver 390 is another predicate that is equivalent to p whenever all the constraints of the solver are true.

The input of the constraint solver 390 is a set of conditions 350 and the possible outputs 355 of the constraint solver 390 include: "the conditions are satisfiable;" "the conditions are not satisfiable;" or "cannot decide within given time limit." Satisfiable conditions normally imply that a feasible path 439 containing a fault is found. If the solver 390 cannot decide whether the conditions in the set of conditions 350 are satisfiable, then no error is generated for the user.

In one exemplary embodiment, the present invention contemplates two levels of constraint solvers 390, namely, state-sensitive and state-insensitive constraint solvers 390. A state-insensitive solver 390 is used by a state-insensitive dataflow analysis 340; while the more accurate state-sensitive solver 390 is used by a state-sensitive data-flow analysis 340 and symbolic execution 360. The difference lies in the treatment of the variables appearing in the list of conditions. While the state-insensitive solver 390 assumes that all the variables are independent of each other, the state-sensitive solver 390 takes into consideration the structure of the flow graph 330 defining the values of the variables. This then provides the difference between the state-sensitive and state—insensitive analysis as was explained earlier.

The state-insensitive solver 390 works by 'anding' all the conditions, while ignoring the graph 330. If that results in an inconsistency, then the conditions are inconsistent even in the more accurate state-sensitive sense and the candidate fault is not feasible. Conditions that are consistent in the state-insensitive sense, however, might not be consistent in the state-sensitive sense.

The state-sensitive solver 390 works by building a set of equalities and inequalities 600, 700, respectively, concerning edges 432 in the graph 330. The equalities and inequalities 600, 700 are obtained by propagating information about inputs of a node 431 to its outputs or vice versa. For example, from $a \in (0,3), b \in (1,4)$ it can be deduced that $a+b \in (1,7)$.

Such information is typically propagated using rewrite rules 820, discussed further below in conjunction with FIGS.

8 through 10, in a known manner. The rewrite rules 820 for propagating information correspond to the laws of arithmetic, or any other data domain. More rules 820 make the solver 390 more powerful, but also slower. Only those rules 820 that are actually found needed in an application domain, such as design automation software, are given to the solver 390. In the case of design automation software, it was sufficient to have only the rules 820 concerning the operations and relations of arithmetic and bit-wise operators. In addition to the small needs for arithmetic, very little propositional calculus sophistication was needed. Resolution with unit clauses proved sufficient.

On the other hand, it is important for the solver 390 to understand the interaction between the data flow and control flow. The issue concerns variables appearing in the conditions 350 input to the solver 390. These variables refer to values they had been assigned in the program 110, and the state-sensitive solver 390 needs to use these values. One approach to the issue considers one path 439 at a time; then all the variables can be replaced unambiguously by their values. Considering one path 439 at a time, however, is too inefficient. It is necessary to consider a bundle of paths 439 at a time. When a bundle of paths 439 are considered, a variable could be assigned different values along different paths 439 in the bundle. Additional approaches to this problem, give the solver 390 a complete description of the values each variable is assigned, and the corresponding conditions, but the description is usually unacceptably large.

The solver 390 can simplify the given flow graph 330 under the conditions 350 given to the solver 390, which may resolve the values of variables. In any case, the simplification will identify two variables as having the same contents if that is implied by the given conditions.

Both the state-sensitive and state-insensitive solvers 390 are incremental in the sense that adding a new condition does not require recalculating what was derived for the prior conditions. This is important because intra-procedural analysis traverses paths 439 and constantly asks the solver 390 whether the partial path 439 traversed so far is feasible.

FIG. 5 is a diagram of an exemplary range constraint data structure 500. As previously indicated, the range constraint data structure 500 records each of the range constraints for a given program 110. As shown in FIG. 5, the range constraint data structure 500 consists of a plurality of records, each associated with a different range constraint 550. For each range constraint 550, the range constraint data structure 500 identifies the associated node in field 505, and indicates one or more corresponding ranges in a range field 510. Each range in the range field 510 consists of zero or more intervals. Each interval contains a pair of integers. The range constraint 550 is therefore a (node, range) pair constraining all possible executions to those which will cause the given node to have an integer value in the given range.

FIG. 6 is a diagram of an exemplary equivalence class data structure 600. As previously indicated, the equivalence class data structure 600 records each of the equivalence classes for a given program 110. As shown in FIG. 6, the equivalence class data structure 600 contains zero or more records, each corresponding to an equivalence class 650. Each equivalence class 650 consists of one or more nodes 431 that have been determined to be equivalent. One of the equivalent nodes is selected to be the representative of the equivalence class and is identified in field 610. The remaining nodes in the equivalence class 650 are identified in field 620.

FIG. 7 is a diagram of an exemplary inequality data structure 700. As previously indicated, the inequality class data structure 700 records each of the inequality constraints for a given program 110. As shown in FIG. 7, the inequality data structure 700 contains zero or more records each associated with a different inequality constraint 750. Each inequality constraint 750 is a quintuple (a, A, b, B, R) consisting of two coefficients a, b, identified in fields 710 and 730, respectively, two nodes A, B, identified in fields 720 and 740, respectively, and a range $R_x$ identified in field 745. An inequality constraint 750 constrains all possible executions to those which will cause the given nodes A, B to have integer values where aA+bB is in the range R. The coefficients a, b are any integers.

In general an inequality constraint 750 is the most general form of a linear constraint involving two nodes. A linear constraint involving just one node would be of the form aA in R, which is equivalent to a range constraint 550. A linear constraint involving three nodes would be of the form aA+bB+cC in R, and similarly for linear constraints involving more nodes. Linear constraints involving more than two nodes are not necessary, as they do not occur often, and when they do occur they can be handled using the rewrite rules. On the other hand, linear constraints involving two nodes occur very often and for efficiency reasons special handling of the form described here is provided by the present invention. Examples of linear constraints between two nodes include A<B represented as 1*A+(−1)*B in (−infinity, 0)

A !=B represented as 1*A+(−1)*B in (−infinity, 0)v (0, infinity)

2*A<3*B+5 represented as 2*A+(−3)*B in (−infinity, 5)

A=B represented as 1*A+(−1)*B in {0}

The last example is an equality, which is more efficiently represented by the equivalence classes 600. Therefore, the linear constraints between two nodes are used to represent just inequalities.

Figure 8:
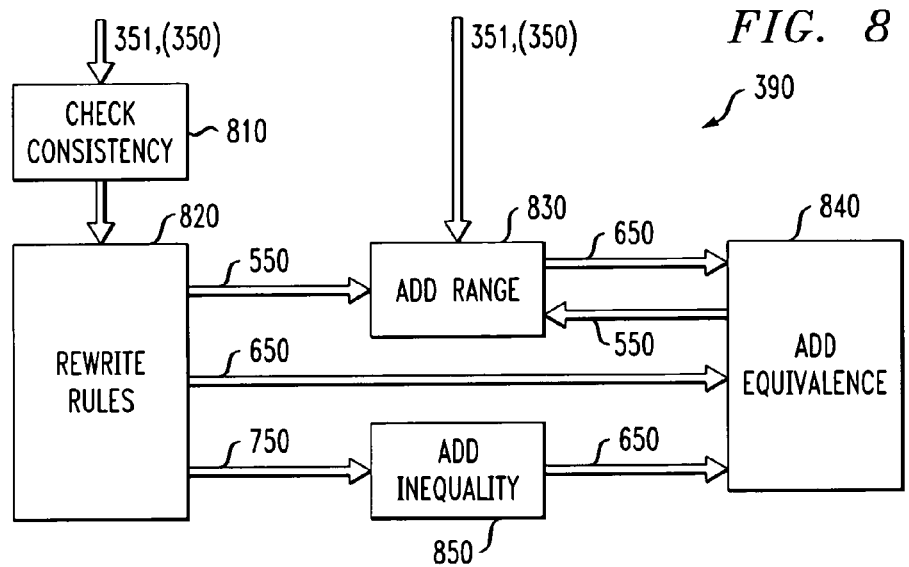
FIG. 8 is a block diagram of one embodiment of a constraint solver architecture of FIG. 3.

FIG. 8 is a block diagram of a constraint solver 390 incorporating features of the present invention. As shown in FIG. 8, the constraint solver 390 is accessed through a check consistency process 810 or an add range process 830. As previously indicated, the constraint solver 390 can be called by the procedures 320, 340, 360 in the static analysis system 150. If a procedure 320, 340, 360 issues a call 351 to the add range process 830, the constraint solver 390 will execute the add range process 830, as well as an add equivalence process 840, as appropriate, each discussed below in conjunction with FIGS. 11 and 12. If a procedure 320, 340, 360 issues a call 351 to the check consistency process 810, the constraint solver 390 will execute a rewrite rules process 820, discussed below in conjunction with FIG. 9. The rewrite rules may call the add range process 830, add equivalence process 840 or the add inequality process 850, as appropriate. Since the rewrite rules process 820 is a computationally expensive process, it is typically only called by the symbolic execution process 360. As shown in FIG. 3, each procedure call 351 includes a new constraint 350 to be evaluated by the constraint solver 390 for consistency.

Figure 9:
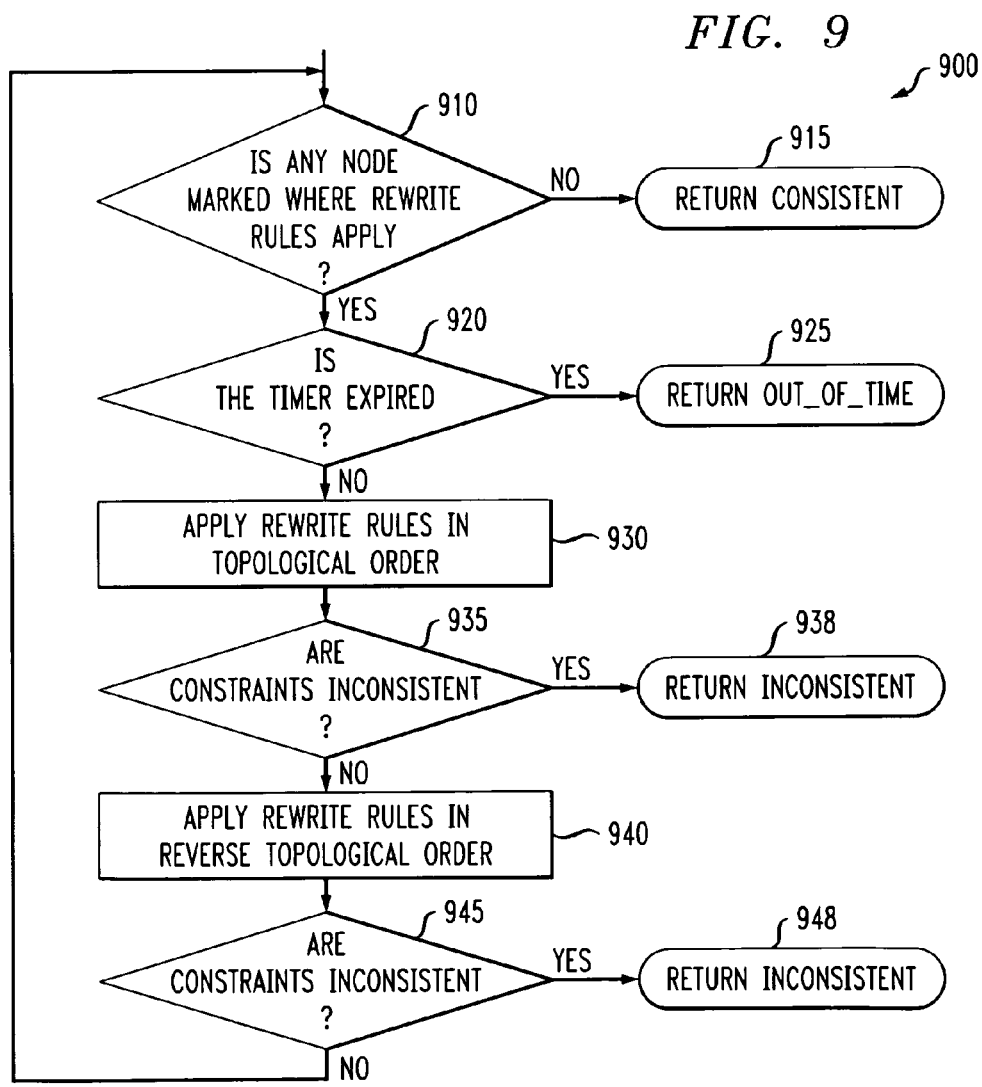
FIG. 9 is a flow chart of an exemplary check consistency process of FIG. 8.

FIG. 9 is a flow chart describing an exemplary check consistency process 810. If a procedure call 351 is made to the check consistency process 810, the process 810 will determine whether the set of contraints 350 in the data structures 500, 600, 700 are consistent with the flow graph The rewrite rules invoked by the check consistency process 810 may, if appropriate, add new nodes 431 and edges 432 to the flow graph 330 and they may call the add range process 830 (FIG. 11), the add equivalence process 840 (FIG. 12) and/or the add inequality process 850 (FIG. 13) which will add new constraints 550, 650, 750 to data structures 500, 600, 700, respectively.

For example, the add range process 830 takes as input a range constraint 550 from the rewrite rules 820 and adds the range constraint 550 to the existing constraints contained in the range data structure 500. In addition, the add range process 830 may derive other constraints and, if appropriate, call the add equivalence process 840 with a new equivalence constraint 650 to add new nodes 431 to the existing equivalence class(es) 650 and/or add new equivalence classes 650 to the equivalence data structure 600. As noted earlier, each equivalence constraint 650 is a pair of nodes which constrains the set of executions to those where the two nodes 431 have identical values.

Similarly, the add inequality process 850 takes as input an inequality constraint 750 and adds the inequality constraint 750 to the inequality data structure 700. In addition, the add inequality process 650 may derive other constraints from the inequality constraints 750 and may call the add equivalence process 840 to add equivalence constraints 650 to the equivalence data structure 600.

Upon entry to the check consistency process 810, a timer is initialized to TIME_LIMIT and the timer is started. As shown in FIG. 9, a test is performed during step 910 to determine if any node 431 has been marked such that rewrite rules 820 would apply. If it is determined during step 910 that no node 431 has been marked, then CONSISTENT is returned to the calling process 320, 340, 360 during step 915. Otherwise, if it is determined during step 910 that a node 431 has been marked, then a further test is performed during step 920 to determine if the check consistency process 810 has been running longer than a preset time limit, TIME_LIMIT.

If it is determined during step 920 that the timer has expired, then OUT_OF_TIME is returned during step 925 to the calling process 320, 340, 360. Otherwise, if it is determined during step 920 that the timer has not expired, then the rewrite rules 820 are applied during step 930.

Initially, all the nodes are ordered during step 930 according to the topology and then each node 431 is visited from the first node to the last node in the ordered list. If a node 431 is a representative of an equivalence class 650, any rule applicable to the node 431 is applied. A test is performed during step 935 to determine if any rewrite rule discovers an inconsistency in the constraints 500, 600, 700. If it is determined during step 935 that a rewrite rule has discovered an inconsistency in the constraints 500, 600, 700, then INCONSISTENT is returned to the calling process 320, 340, 360 during step 938.

Rules are then applied in reverse topological order during step 940. Each node 431 is visited from the last node to the first node in the ordered list. If a node 431 is a representative of an equivalence class 650, then any rule applicable to the node 431 is applied. A test is performed during step 945 to determine if any rule has discovered an inconsistency in the constraints 500, 600, 700. If it is determined during step 945 that a rewrite rule has discovered an inconsistency in the constraints 500, 600, 700, then INCONSISTENT is returned to the calling process 320, 340, 360 during step 948. If, however, it is determined during step 945 that a rewrite rule has not discovered an inconsistency in the constraints 500, 600, 700, then program control returns to step 910 and continues in the manner described above.

FIG. 10 illustrates an example of a rewrite rule 820. A flow graph 1010 is a portion of the larger flow graph 330 prior to the application of a rewrite rule 820. As shown in FIG. 10, three nodes A, B, C are applied to an addition node "+," which is labeled D. A range constraint 1015 associated with node D is present in the range data structure 500. The range associated with node D is equal to zero. The result of applying the rewrite rules 820 to the flow graph 1010 is the flow graph 1020, whereas node E has been added to the original flow graph 1010 to represent the expression $-(A+B)$. More specifically, the range constraint 1015 associated with node D (i.e., that D is equal to 0), implies that the expression defined by flow graph 1010 (i.e., $(A+B+C)=D$) must equal 0 and may be expressed as follows:

$$A+B=-C \text{ or } C=-(A+B).$$

Thus, the node E is added to the flow graph 1020 to express the following:

$$E=-(A+B),$$

and the equivalence structure 1030 is added to the data structure 600 to indicate that the nodes C and E are equivalent.

For example, the rewrite rules 820 may optionally include one or more of the following exemplary rules:

Rule 1: Consider
signed int S;
unsigned int U;
U=(unsigned int) S; or S=(signed int) U
Then
    Add_Range(U, RangeOf(S) & $(-1, 2^{\wedge}31)$ | RangeOf(S) & $(-2^{\wedge}31-1,0)+2^{\wedge}32$)
    Add_Range(S, RangeOf(U) & $(-1, 2^{\wedge}31)$ | RangeOf(U) & $(-2^{\wedge}31-1,0)-2^{\wedge}32$)

Rule 2: Consider
X=A ? B:C;
if RangeOf(A) & {0}==empty then Add_Equivalence(X, B)
if RangeOf(A) is a subset of {0} then Add_Equivalence (X, C)
if B=C then Add_Equivalence(X, C)

Rule 3: Consider
    X=A op B, where op is an operator +,−, *, /, %, and po is the inverse of op
then
Add_Range(X, RangeOf(A) op RangeOf(B))
Add_Range(A, RangeOf(X) po RangeOf(B))

Rule 4: Suppose
X=a*A+b*B+C, where a and b are integer constants
then
Add_Inequality(a, A, b, B, RangeOf(X)−RangeOf(C))

Rule 5: Suppose
0=A+B+C
then
Add_equivalence(C, −A−B)
Rule 5 is applied only to the term C that is latest in topological order.

Rule 6:
A(I)=u; x=A(J);
becomes
A(I)=u; x=u; provides I=J
alternatively it becomes
x=A(J); A(I)=u; provided RangeOf(I) & Range(J) is empty Rule 7:
if (a) {S} else {T} x=u;

becomes if (a) {S} else {T; x=u;} provided a=0 or if (a) {S; x=u;} else {T} provided RangeOf(a) does not contain 0

Rule 8: For any operation

X=A op B if A=A' and B=B' and X'=A' op B' then Add_Equivalence(X, X')

Figure 11:
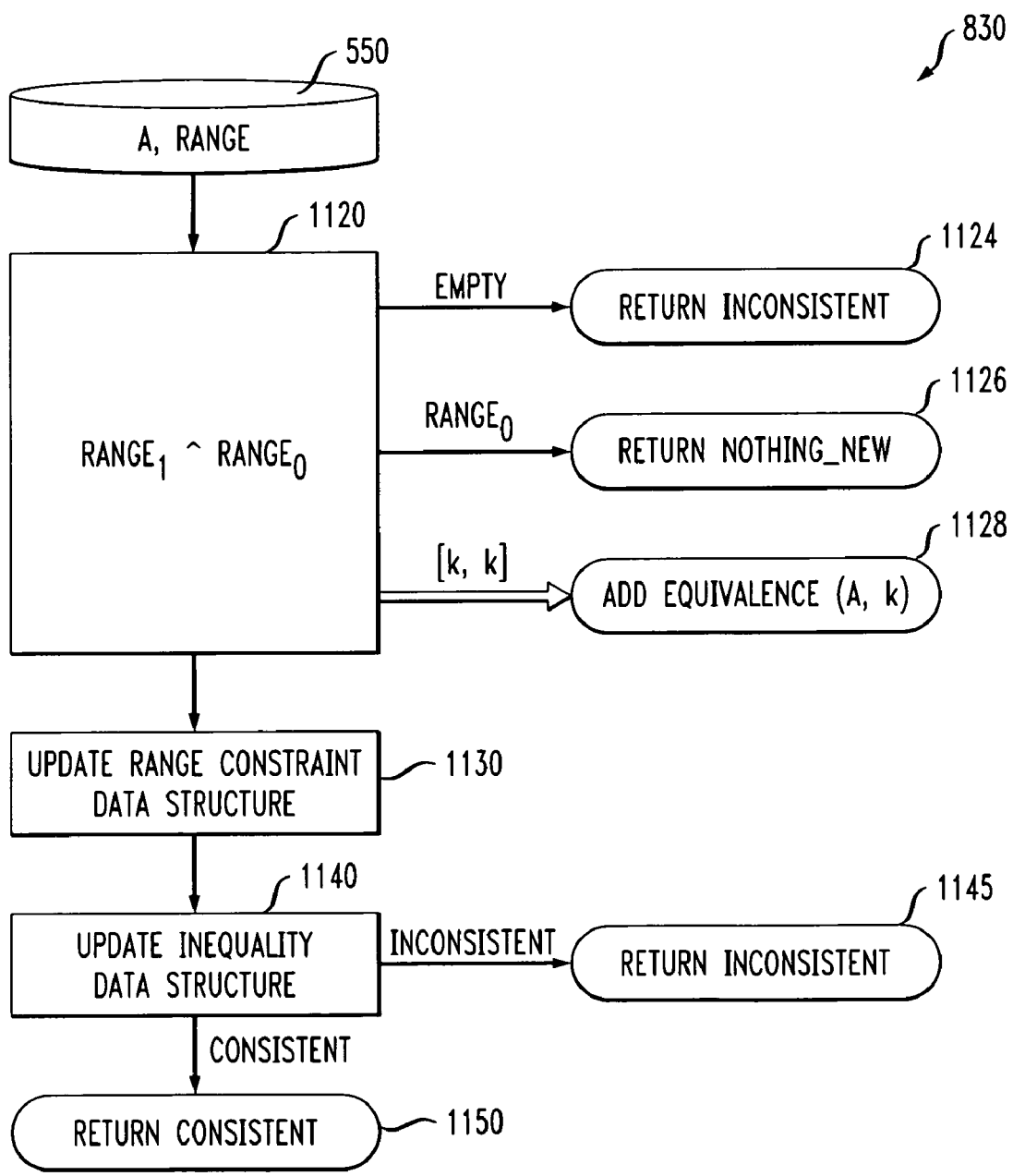
FIG. 11 is a flow chart of an exemplary add range process of FIG. 8.

FIG. 11 is a flow chart describing an exemplary add range process 830. As previously indicated, the add range process 830 will add a range constraint 550 to the range data structure 500. For example, the data structure 500 can initially contain a range constraint indicating that a given node, A, has a corresponding $Range_0$. A new range constraint is input using the add range process 830 indicating that the given node, A, also has a corresponding Range. Initially, the add range process 830 forms the intersection of $Range_0$ and Range during step 1120 to test the contents of the intersection. If it is determined during step 1120 that the intersection is empty, then the add range process 830 returns INCONSISTENT to the calling routine during step 1124. If it is determined during step 1120 that the new Range is equal to the original $Range_0$, then there are no changes to the constraint(s) and $NOTHING_{13}$ NEW is returned to the calling process during step 1126. If it is determined during step 1120 that the intersection consists of a single number k, then the add equivalence process 640 is called during step 1128 to add the equivalence node pair (A, k) to the data structure 600. Here, k is a node 431 representing the integer k.

In step 1130, the data structure 500 is updated by changing the range constraint 550 of each node 431 sharing the equivalence class of A (as indicated by data structure 600) to contain the intersection of $Range_0$ and Range.

In step 1140, the inequality data structure 700 is updated using the process 1400 on each inequality record present in 700. If the process 1400 returns INCONSISTENT for any of the inequalities, then so does process 830. Otherwise, CONSISTENT is returned to the calling process during step 1150.

Figure 12:
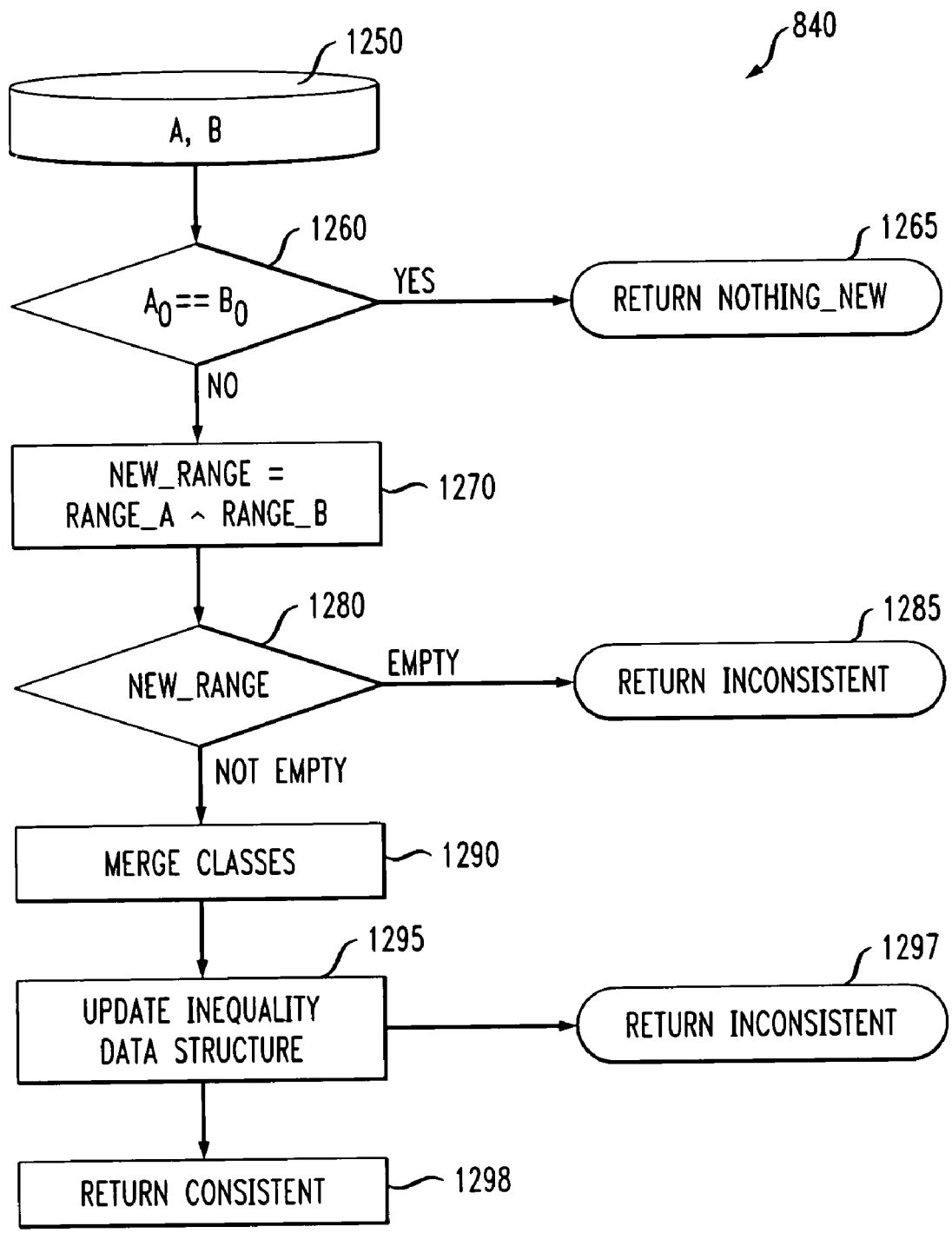
FIG. 12 is a flow chart of an exemplary add equivalence process of FIG. 8.

FIG. 12 is a flow chart of an exemplary add equivalence process 840. As previously indicated, the add equivalence process 840 will add an equivalence constraint 650 to the equivalence data structure 600. For example, assume that the range data structure 500 contains two range constraints indicating that a node A has a range, $Range_A$, and a node B has a range, $Range_B$. In addition, assume that the equivalence data structure 600 contains two equivalence classes indicating that a representative node, $A_0$, has equivalent nodes including a node A, and a representative node, $B_0$, has equivalent nodes including a node B.

As shown in FIG. 12, a new equivalence constraint 1250 containing nodes A and B is input to the add equivalence process 840. In step 1260, if nodes A and B are in the same equivalence class 650, then there are no changes to the existing constraints and $NOTHING_{13}$ NEW is returned to the calling process during step 1265. If A and B are not in the same equivalence class 650, then a variable, $NEW_{13}$ RANGE, is set equal to the intersection of $Range_A$ and $Range_B$. A test is performed during step 1280 to determine if the variable, NEW_RANGE, is empty. If it is determined during step 1280 that the variable is empty, then the constraints 500, 600 are inconsistent and INCONSISTENT is returned during step 1285 to the calling process. If it is determined during step 1280 that the variable is not empty, the constraints 500, 600 are consistent and the two equivalence classes indicating that a representative node, $A_0$, has equivalent nodes including a node A, and a representative node, $B_0$, has equivalent nodes including a node B will be merged during step 1290 with their union. In step 1295, the inequality data structure 700 is updated using the process 1400, which may return INCONSISTENT, in which case the process 1200 also returns INCONSISTENT during step 1297. Otherwise, CONSISTENT is returned to the calling program during step 1298.

Figure 13:
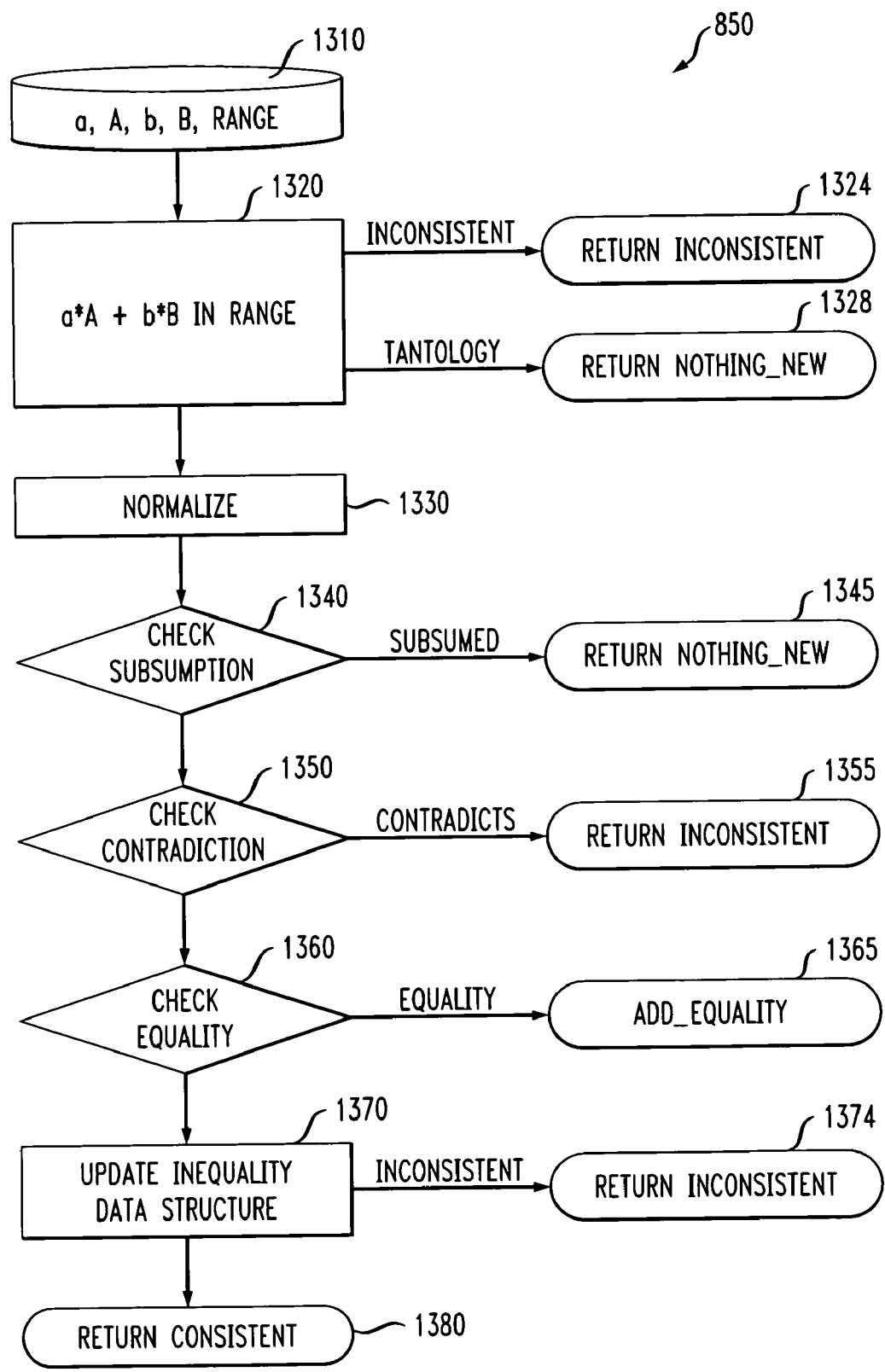
FIG. 13 is a flow chart of an exemplary add inequality process of FIG. 8.

FIG. 13 is a flow chart of an exemplary add inequality process 850. As previously indicated, the add inequality process 850 will add an inequality constraint 750 to the inequality data structure 700. As shown in FIG. 13, an inequality constraint {a, A, b, B, Range} 1310 representing the relation $a*A+b*B \in Range$ is applied to the add inequality process 850. A test is initially performed during step 1320 (using the inequality range process 1400 of FIG. 14) to determine whether the given inequality constraint 1310 is inconsistent with the data structures 500, 600, 700. If the inequality constraint 1310 is inconsistent with the data structures 500, 600, 700, then INCONSISTENT is returned to the calling procedure during step 1324.

If the inequality constraint 1310 is implied by the constraints of data structures 500, 600, 700, then there is no new information and NOTHING_NEW is returned to the calling procedure 320, 340, 360 during step 1328. Otherwise, step 1330 is performed, where the input inequality constraint 1310 is normalized. The normalization of the input inequality constraint 1310 will, e.g., remove any common divisors, and ensure that the inequality expressions are always written in the same canonical way.

For example, in step 1330, if node A 431 does not come before node B 431 in topological order, then nodes A and B are swapped. In addition, if a is less than zero, then the values a, b, and Range are multiplied by −1. Likewise, if the values a, b are not relatively prime, then the values a, b and Range are divided by their greatest common divisor.

In step 1340, a subsumption test is performed. If the inequality data structure 700 contains an inequality a, A, b, B, Range' and Range' is a subset of Range, then no new information is obtained and NOTHING_NEW is returned to the calling procedure 320, 340, 360 during step 1345. If the inequality data structure 700 contains an inequality a, A, b, B, Range' and Range' is a superset of Range, then the inequality constraint a, A, b, B, Range' is deleted from the inequality data structure 700 and Range is set equal to Range^Range'.

In step 1350, if an inequality a, A, b, B, Range contradicts an existing inequality a', A, b', B, Range', then INCONSISTENT is returned to the calling procedure during step 1355. Otherwise, the equality is evaluated during step 1360. In step 1360, if Range consists only of the number 0 and a*b equals −1, then the add equality process 840 is called during step 1365 to add the equivalent node pair (A,B) 431 to the equivalence data structure 600. Otherwise, the inequality data structure 700 is updated during step 1370. In step 1370, the inequality data structure 700 is updated by adding the inequality a, A, b, B, Range to the list of inequalities 700. Each inequality constraint (b', B, c, C, Range') in data structure 700 is tested and, if the expression Add_Inequality (a*b', A, −b*c, C, b'*Range−b*Range') equals inconsistent, then INCONSISTENT is returned in step 1374. Each inequality constraint (a', A, c, C, Range') in data structure 700 is tested and, if the expression Add_Inequality(a'*b, B, −a*c, C, a'*Range−a*Range') equals inconsistent, then INCONSISTENT is returned in step 1374. Otherwise, CONSISTENT is returned in step 1380.

Figure 14:
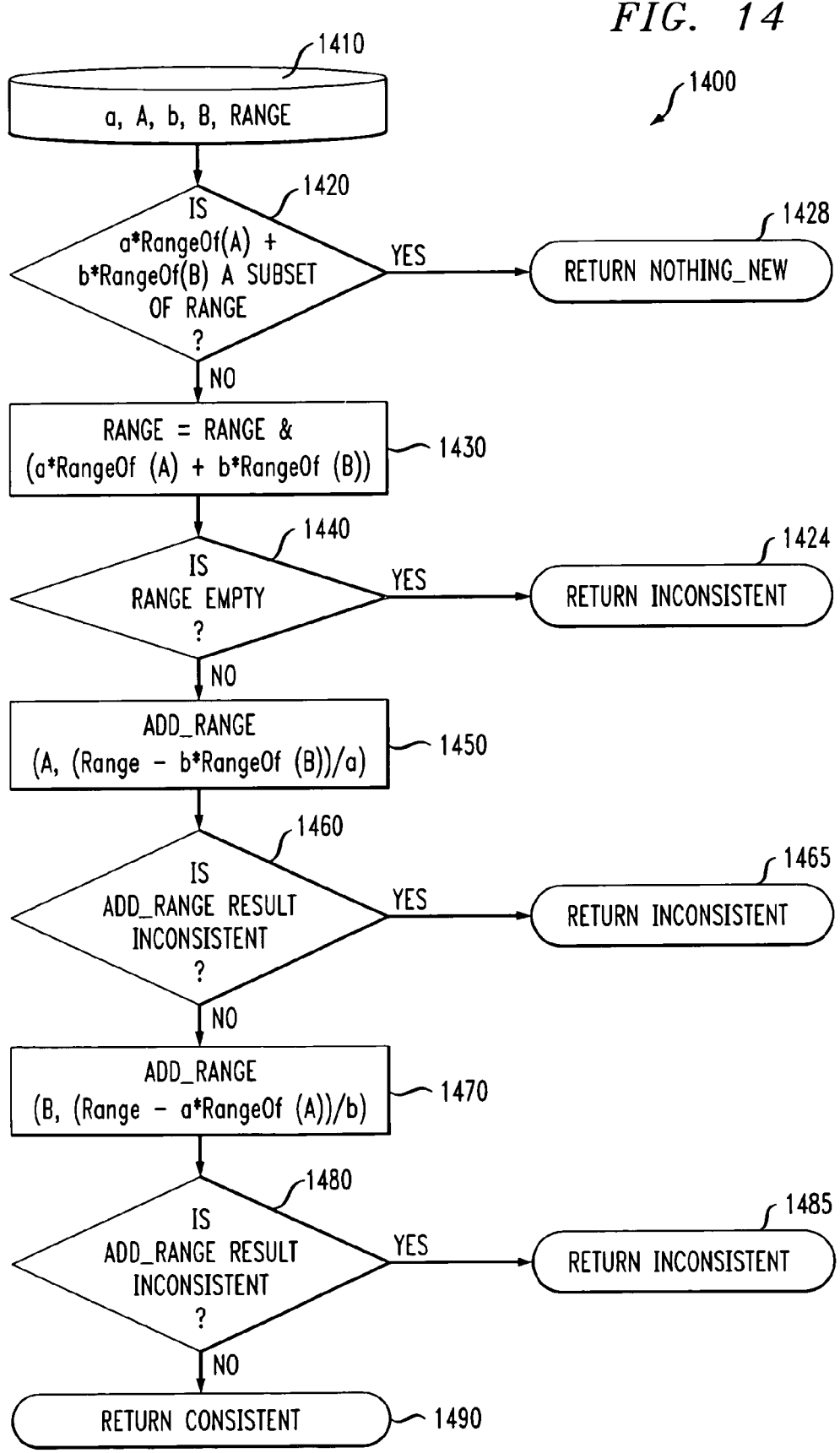
FIG. 14 is a flow chart of an exemplary inequality range process.

FIG. 14 is a flow chart for an exemplary inequality range process 1400. Generally, the add inequality range process 1400 derives information about the ranges of nodes A and B from the inequality a*A+b*B in Range. The process 1400 updates the Range and returns the updated range to the calling process. In step 1410, the process 1400 is passed the inequality constraint (a, A, b, B, Range). In step 1420, a*RangeOf (A)+b*RangeOf (B) is evaluated to determine if the result is a subset of Range. If a*RangeOf (A)+b*RangeOf (B) is a subset of Range, then NOTHING_NEW is returned in step 1428. Otherwise, Range is set equal to Range & (a*RangeOf (A)+b*RangeOf (B)) in step 1430.

In step 1440, Range is tested to determine if it is empty. If Range is empty, then INCONSISTENT is returned in step 1424. Otherwise, the range constraint (A, (Range−b*RangeOf (B))/a) is added to the range constraint data structure 500 by calling add range in step 1450. The result of the add range call is then tested in step 1460. If the add range result is inconsistent, then INCONSISTENT is returned in step 1465. Otherwise, the range constraint (B, (Range−a*RangeOf (A))/b) is added to the range constraint data structure 500 by calling add range in step 1470. The result of the add range call is then tested in step 1480. If the add range result is inconsistent, then INCONSISTENT is returned in step 1485; otherwise, CONSISTENT is returned in step 1490.

FIG. 15 is an example error report 180 produced by the invention. As shown in FIG. 15, the error report 180 includes a list of branch points 1581 in the source code 110, which must be followed for the error to occur. For example, the exemplary error report 180 is an uninitialized variable error and indicates at least one possible path leading to the error.

It is to be understood that the embodiments and variations shown and described herein are merely illustrative of the principles of this invention and that various modifications may be implemented by those skilled in the art without departing from the scope and spirit of the invention.

What is claimed is:

1. A computer-implemented method for analyzing a software program, said method comprising the steps of:
  receiving input constraints for a path in said software program to be feasible;
  applying one or more rewrite rules to a flow graph of said software program defining how said flow graph can change;
  adding at least one new node or new edge to said flow graph based on said rewrite rules;
  deriving new constraints by arithmetic constraint solving from said input constraints, said flow graph and one or more existing constraints; and
  adding said one or more new constraints to said existing constraints.

2. The method of claim 1, wherein said input constraints include a range constraint.

3. The method of claim 1, wherein said step of adding said one or more new constraints incrementally adds said one or more new constraints to said one or more existing contraints.

4. The method of claim 1, wherein said method interacts with a semantic analyzer to eliminate paths through said software program that will not be traversed during execution of said software program.

5. The method of claim 1, wherein said method interacts with a data flow analyzer to eliminate paths through said flow graph that will not be traversed during execution of said software program.

6. The method of claim 1, wherein said method interacts with a symbolic executor to eliminate paths through said flow graph that will not be traversed during execution of said software program.

7. A computer-implemented method of performing static software analysis comprising:
  parsing source code and creating a parse tree;
  performing semantic analysis on said parse tree to create a flow graph;
  performing data flow analysis on said flow graph to identify potential errors; and
  performing symbolic execution of paths corresponding to said potential errors to identify confirmed errors, wherein at least one of said semantic analysis, data flow analysis and symbolic execution interact with a constraint solver.

8. The method of claim 7, wherein said constraint solver receives input constraints for a path in said software program to be feasible; applies rewrite rules to a flow graph of said software program; adds at least one new node or new edge to said flow graph based on said rewrite rules; derives new constraints by arithmetic constraint solving from said input constraints, said flow graph and one or more existing constraints; and adds said one or more new constraints to said existing constraints.

9. The method of claim 8, wherein said input constraints include one or more range constraints.

10. The method of claim 8, wherein said constraint solver is further configured to incrementally add said one or more new constraints to said one or more existing contraints.

11. A computer-implemented method for solving constraints when analyzing a software program, comprising:
  receiving at least one inequality constraint for a path in said software program to be feasible, wherein said inequality constraint is represented by a first and second integer number $i_0$ and $i_1$, a first and second node $N_a$ and $N_b$ and a range of numbers R; and
  storing said at least one inequality constraint in an inequality data structure having at least one inequality record, each inequality record defining an inequality constraint, the inequality constraint being that the product of the first integer number and said first node added to the product of the second integer number and said second node is within an inequality range.

12. The method of claim 11, wherein execution of said software program is constrained to parameters where said first and second nodes have integer values which satisfy the equation:

$$i_0 \times N_a + i_1 \times N_b \in R.$$

13. A computer-implemented constraint solver for analyzing a software program, said constraint solver comprising:
  a range-constraint data structure having at least one node record corresponding to a range constraint, each node record having a node identifier identifying a node that is an operation in a flow graph of the software program and zero or more intervals associated with the respective node, the intervals including all of the possible values that the node can have during the execution of the software program;
  an equivalence data structure having at least one record that identifies zero or more sets of equivalent nodes that have an equivalence constraint, the equivalence constraint indicating that each of said nodes in one of the sets of equivalent nodes have the same value during a time in an execution of the software program;

an inequality data structure having at least one inequality record, each defining an inequality constraint, the inequality constraint being that the product of a first value and a first node added to the product of a second value and a second node is within an inequality range; and a processor that returns an inconsistent indication only if the at least one range constraint, at least one equivalence constraint, and at least one inequality constraint are inconsistent.

14. The constraint solver of claim 13, wherein said processor incrementally adds said one or more new constraints to said at least one range constraint, at least one equivalence constraint, and at least one inequality constraint.

15. The constraint solver of claim 13, wherein at least one of the data structures is persistent.

16. The constraint solver of claim 13, wherein the range constraint is provided from one or more of an invocation from a semantic analyzer, a data flow analysis or a symbolic executor.

17. A computer-implemented constraint solver for analyzing a software program, said constraint solver comprising:

a range-constraint data structure having at least one node record corresponding to a range constraint, each node record having a node identifier identifying a node that is an operation in a flow graph of the software program and zero or more intervals associated with the respective node, the intervals including all of the possible values that the node can have during the execution of the software program;

an equivalence data structure having at least one record that identifies zero or more sets of equivalent nodes that have an equivalence constraint, the equivalence constraint indicating that each of said nodes in one of the sets of equivalent nodes have the same value during a time in an execution of the software program;

an inequality data structure having at least one inequality record, each defining an inequality constraint, the inequality constraint being that the product of a first value and a first node added to the product of a second value and a second node is within an inequality range;

a rule base having one or more rules that define how the flow graph can change; and a constraint solver that returns an "inconsistent" indication only if the range constraints, the equivalence constraints, and the inequality constraints are inconsistent.

18. An apparatus for analyzing a software program, comprising:

a memory; and at least one processor, coupled to the memory, operative to:

receive input constraints for a path in said software program to be feasible;

apply one or more rewrite rules to a flow graph of said software program defining how said flow graph can change;

add at least one new node or new edge to said flow graph based on said rewrite rules;

derive new constraints by arithmetic constraint solving from said input constraints, said flow graph and one or more existing constraints; and add said one or more new constraints to said existing constraints.

19. An apparatus for performing static software analysis, comprising:

a memory; and at least one processor, coupled to the memory, operative to:

parse source code to create a parse tree;

perform semantic analysis on said parse tree to create a flow graph;

perform data flow analysis on said flow graph to identify potential errors; and perform symbolic execution of paths corresponding to said potential errors to identify confirmed errors, wherein at least one of said semantic analysis, data flow analysis and symbolic execution interact with a constraint solver.

20. An article of manufacture for analyzing a software program, comprising a machine readable medium containing one or more programs which when executed implement the steps of:

a memory; and at least one processor, coupled to the memory, operative to:

receiving input constraints for a path in said software program to be feasible;

applying one or more rewrite rules to a flow graph of said software program defining how said flow graph can change;

adding at least one new node or new edge to said flow graph based on said rewrite rules;

deriving new constraints by arithmetic constraint solving from said input constraints, said flow graph and one or more existing constraints; and adding said one or more new constraints to said existing constraints.

21. An article of manufacture for performing static software analysis, comprising:

a memory; and at least one processor, coupled to the memory, operative to:

parsing source code to create a parse tree;

performing semantic analysis on said parse tree to create a flow graph;

performing data flow analysis on said flow graph to identify potential errors; and performing symbolic execution of paths corresponding to said potential errors to identify confirmed errors, wherein at least one of said semantic analysis, data flow analysis and symbolic execution interact with a constraint solver.

* * * * *